United States Patent [19]

Gusmeroli et al.

[11] Patent Number: 5,333,045
[45] Date of Patent: Jul. 26, 1994

[54] PROCESS AND APPARATUS FOR ABSOLUTE INTERFEROMETRIC MEASUREMENT OF PHYSICAL MAGNITUDES UTILIZING A VARIABLE CENTER FREQUENCY PASS-BAND FILTER LOCATED DOWNSTREAM OF A LIGHT BEAM SOURCE

[75] Inventors: Valeria Gusmeroli, Milan; Mario Martinelli, San Donato Milanese, both of Italy

[73] Assignee: CISE s.p.a., Milan, Italy

[21] Appl. No.: 838,886

[22] Filed: Feb. 21, 1992

[30] Foreign Application Priority Data

Feb. 27, 1991 [IT] Italy .............. MI91A000509

[51] Int. Cl.⁵ .................................... G01B 9/02
[52] U.S. Cl. ........................ 356/345; 356/351; 356/352; 356/358
[58] Field of Search ............ 356/345, 356, 358, 352, 356/351; 250/227.27, 227.19

[56] References Cited

U.S. PATENT DOCUMENTS 4,886,363 12/1989 Jungquist .............. 356/358
4,890,922 1/1990 Wilson .
4,972,077 11/1990 Willson et al. .............. 356/345

FOREIGN PATENT DOCUMENTS 0359666 3/1990 European Pat. Off. .
3044183 6/1982 Fed. Rep. of Germany .

OTHER PUBLICATIONS

"Monomode Optical Fiber Interferometers", Jackson, Journal of Physics E. Scientific Instruments, 1985, pp. 985–987.

Primary Examiner—Samuel A. Turner
Attorney, Agent, or Firm—Sixbey, Friedman, Leedom & Ferguson

[57] ABSTRACT

A superluminescent source emits a wide-band light beam, that is frequency modulated by a filter with a pass band centred on a frequency that is made to vary according to a predetermined law so as to frequency modulate the light beam. Means for splitting and recombining beams determine a mutual phase shift between two components of the beam that depends on the physical magnitude to be measured and is detected by a detector as an indication of the value of the magnitude itself.

11 Claims, 3 Drawing Sheets

PROCESS AND APPARATUS FOR ABSOLUTE INTERFEROMETRIC MEASUREMENT OF PHYSICAL MAGNITUDES UTILIZING A VARIABLE CENTER FREQUENCY PASS-BAND FILTER LOCATED DOWNSTREAM OF A LIGHT BEAM SOURCE

The present invention relates to a process and an apparatus for absolute interferometric measurements of physical magnitudes.

The term interferometric measurements means measurements based on the assessment of the phase shift between two components of a light beam emitted by a light source and received by a detector.

The use of an interferometric measurement technique allows, for example, the execution of a measurement of distance of a mirror target in a classical interferometer such as, for example, that of Michelson, As is known, the latter comprises essentially an optical beam splitter constituted by a semitransparent plate arranged at 45° to the direction of propagation of an incident beam, a reference mirror in a fixed position and a target mirror in a variable position, aligned along the direction of reflection and along the line of transmission of the incident beam, respectively. The latter, passing through the splitter, is thus in part reflected toward the reference mirror and in part transmitted toward the target mirror. The beams hitting the mirrors are reflected by the same and each of them, upon meeting the splitter again, is, as above, in part reflected and in part transmitted. The beam's reflected part coming from the target mirror and the beam's transmitted part coming from the reference mirror are aligned along the same direction of propagation which leads them to the input of a detector, where they interfere giving rise to an interference figure. From this it is possible to deduce the phase shift and thus the difference in the paths travelled by the two beams between the splitter and the reference and target mirrors, respectively, that is, in short, the distance of the target mirror.

Another use of the interferometric technique allows the measurement of physical magnitudes of a different type, such as, say, temperature, deformation and pressure, using optical fibres as sensors.

In this respect there are two methods for executing these measurements.

A first method, called the guided-wave method, uses a pair of optical fibres, one of which is used as a reference fibre, while the other is used as a measurement fibre, immersed in the area subjected to measurement. The two fibres are coupled together through a coupler at the output of a light source, say, a narrow-band laser source, and then recoupled beyond the measurement area through a second coupler located at the input of a detector. In general, the presence of a particular physical parameter alters the speed of propagation of a light beam in an optical fibre. As a consequence of this, the two components of the light beam emitted by the light source, passing through the optical reference fibre and the optical measurement fibre, respectively, shall arrive at the detector with a phase shift between them and, by measuring the phase shift itself, it shall be possible to go back to the determination of the physical parameter that has had an effect on the measurement fibre.

A second method provides for the use of a single fibre having a high birefringence. It is known that the presence of particular physical parameters has a different effect on the two bias modes emerging from an optical fibre having a high birefringence. The corresponding components of the light beam, after they have been projected on the same plane by a biasing unit located at the extremity of the fibre, shall enter the detector with a phase shift and from the measurement of the corresponding phase shift it shall be possible to go back to the determination of the physical parameter to which the fibre has been subjected.

The application of such interferometric techniques allows the determination of the phase shift between the components at input to the detector only with multiples of less than $2\pi$, thus in an incremental and a "non-absolute" manner.

A known technique for executing absolute interferometric measurements provides for the frequency of the light beam emitted by the source to be made to vary according to a predetermined law, in particular sinusoidally. At the output of the interferometer there will thus be obtained a modulated beam in phase with the depth of modulation $$D\phi = 2\pi DLDf/c$$

where DL is the difference of optical path between the two arms of the interferometer, $Df$ is the frequency shift caused by the modulation and c is the speed of light.

With the current modulation techniques, which in a semiconductor laser source are based in short on the variation of the current $I_o$ of the source, $Df$ cannot be very large because this would mean a large variation of $I_o$ with inevitable functional drawbacks of the source.

It thus follows that according to the known art it is possible to obtain only a limited depth of modulation and thus a fairly modest measurement sensitivity of DL.

The object of the present invention is to accomplish a process and an apparatus for absolute interferometric measurements, with which it is possible to obtain a high depth of phase modulation of the interferometer.

According to the invention such object is attained through a process for absolute interferometric measurements of physical magnitudes, comprising the delivery of a light beam from a source, the frequency modulation of said light beam, the phase shifting of components of the light beam as a function of the physical magnitude to be measured, the detection and the measurement of the phase shift of said components of the light beam, characterized in that said delivery is executed so as to produce a wide-band light beam and said modulation is executed by means of pass-band filtering process centred on a frequency that is made to vary with a predetermined law.

According to the invention there is also accomplished an apparatus for absolute interferometric measurements of physical magnitudes, comprising a light beam source, means for the frequency modulation of said light beam, means for splitting and recombining beams to cause the splitting of the light beam into two components with a mutual phase shift dependent on the physical magnitude to be measured and a detector suitable for detecting said components of the light beam and for measuring their mutual phase shift, characterized in that said light source is a wide-band source and said means for modulating the light beam are constituted by a pass-band filter centred on a frequency that is made to vary according to a predetermined law.

In this way the introduction of the filter downstream from the wide-band source allows the accomplishment of a frequency modulation of the light beam with a high depth of modulation which makes it possible to obtain absolute interferometric measurements of the difference of optical paths with a high sensitivity.

In particular said wide-band source is a superluminescent laser source and the filter's central frequency, that can, for example, be of the interferential type or of the Fabry Perot type, is made to vary with a sinusoidal law.

According to a first embodiment the means for splitting and recombining the beams comprise an optical beam splitter with a semitransparent lamina, which splits the light beam into a reflected component directed toward a reference mirror and into a transmitted component directed toward a target mirror that can be placed at a variable distance from the optical splitter and recombines said components into a single beam after reflection on the part of said mirrors, so that the phase shift of said recombined components is indicative of the variable position of said target mirror.

According to a second embodiment, the means for splitting and recombining the beams comprise an optical reference fibre and an optical measurement fibre connected at the extremities by input and output optical couplers. The optical measurement fibre is subjected to a particular physical magnitude suitable for inducing a difference between the time of propagation of the component of the light beam passing through it and that of the component of the light beam passing through the reference fibre. The detector receives the components of the light beam coming from the abovementioned fibres and on the basis of the corresponding phase shift allows the assessment of the abovementioned physical magnitude.

According to a third embodiment the means for splitting and recombining the beams comprise an optical fibre having a high birefringence immersed in a particular physical magnitude suitable for having a different effect on the speeds of propagation of the two components of the light beam that propagate according to the fibre's two bias modes. The detector receives said components of the light beam and on the basis of the corresponding phase shift allows the assessment of the abovementioned physical magnitude.

The features of the present invention shall be made more evident by the embodiments illustrated as nonlimiting examples in the enclosed drawings, wherein.

Figure 1:
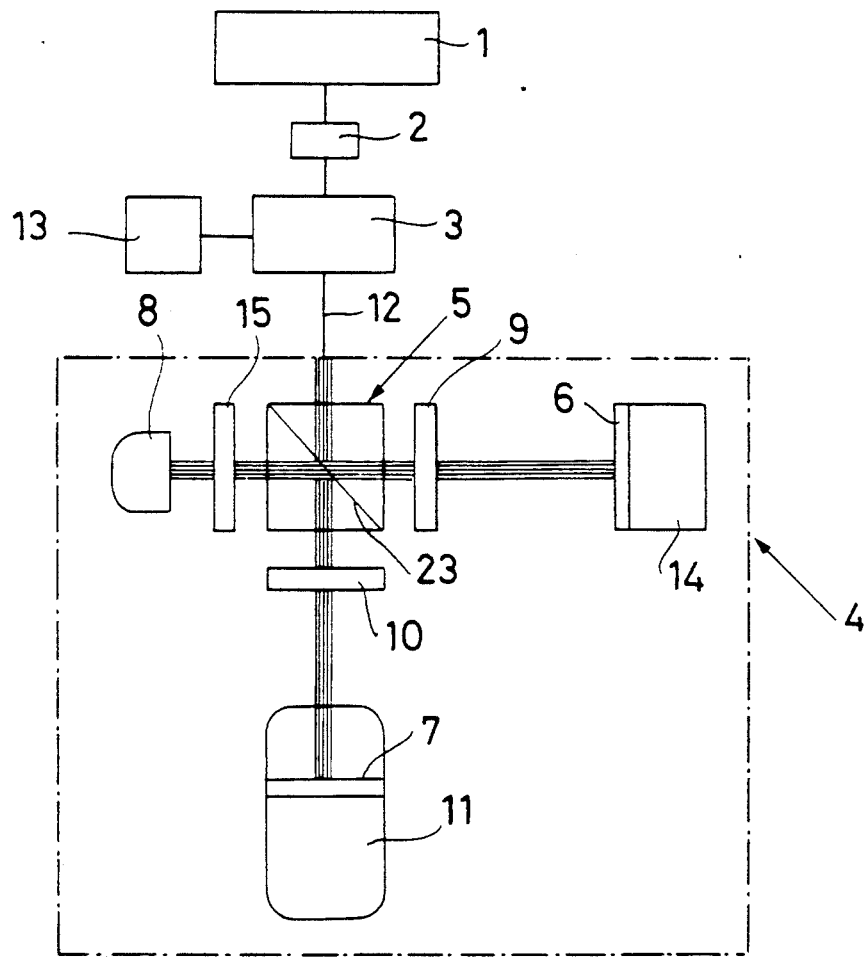
FIG. 1 illustrates a first embodiment of the apparatus according to the invention.

With reference to FIG. 1, the apparatus comprises a wide-spectrum superluminescent source of light 1, such as, say, a laser source of the type RCA 86063 F-15-TC with a central wavelength of 850 nm, spectrum amplitude 20 nm.

It also comprises a collimator 2 and an interferential filter 3, such as, say, a Corion filter S10-850 with a central wavelength of 850 nm, spectrum amplitude 10 nm. The angular position of the filter 3 with respect to its axis is made to vary in an oscillating manner with a sinusoidal law by a special device 13 (for example, a galvanometer) supplied with a sinusoidal signal; as an alternative, it is possible to use a filter of the Fabry Perot type, of which the length of the cavity that houses the refringent means or the latter's refraction index is made to vary (for example, if the refringent means is an electro-optical crystal, by causing the voltage applied across the crystal itself to vary). A desired law and depth of frequency modulation of the light beam at input is thus guaranteed.

In cascade to the filter 3 there is connected, through an optical fibre 12, an interferometer 4. The latter comprises an optical beam splitter 5, of the bias-difference type, constituted by a semi-transparent plate 23 arranged at 45° to the direction of propagation of the incident beam, a reference mirror 6 integral with an oscillating support 14 operated by a saw-tooth signal so as to give a carrier to the light beam reflected by it, a target mirror 7 with a position variable with respect to a support 11, a bias analyser 15 and a detector 8. Between the optical beam splitter 5 and the mirrors 6, 7 there are also interposed quarter-wave laminae 9, 10 suitable for introducing 45° phase shifts in the light beams passing through them.

According to this first embodiment the apparatus works as a detector of the phase shift of the components of the light beam coming from the two mirrors 6, 7 arranged at a different distance with respect to the optical beam splitter 5 and is thus suitable for determining the position of the target mirror 7.

In particular the light beam at output from the source 1 is sent to the collimator 2 suitable for forming a collimated beam. The beam at output from the collimator 2 passes into the filter 3, where it is frequency modulated with a sinusoidal law, and then through the optical fibre 12 it is sent to the interferometer 4. The beam impinges upon the semi-transparent plate 23 of the optical beam splitter 5 and is thus separated into a reflected component and into a transmitted component, corresponding to two different bias modes of the incident beam. There are sent to the reference mirror 6 and to the target mirror 7, respectively, which reflect them back. The components of the beam thus travel twice through the quarter-wave laminae 9, 10, a first time to go and impinge upon the mirrors 6, 7, a second time after being reflected by the mirrors themselves. In this way, the component of the beam splitter 5 previously reflected is now transmitted and, vice versa, the component previously transmitted is now reflected. The two components thus recombine into a single beam whose bias modes are projected on a common plane by the analyser 15. This recombined beam is received by the detector 8, which supplies at output an electrical signal that is proportional to the interference signal, that contains the desired phase shift term $D\phi$.

Since such phase shift is the result of the different distances of the mirrors 6, 7 from the spliter 5, the signal at output from the detector 8 thus contains information that is indicative of the distance of the target mirror 7 from the optical beam splitter 5 and thus of the position of the target mirror.

Figure 2:
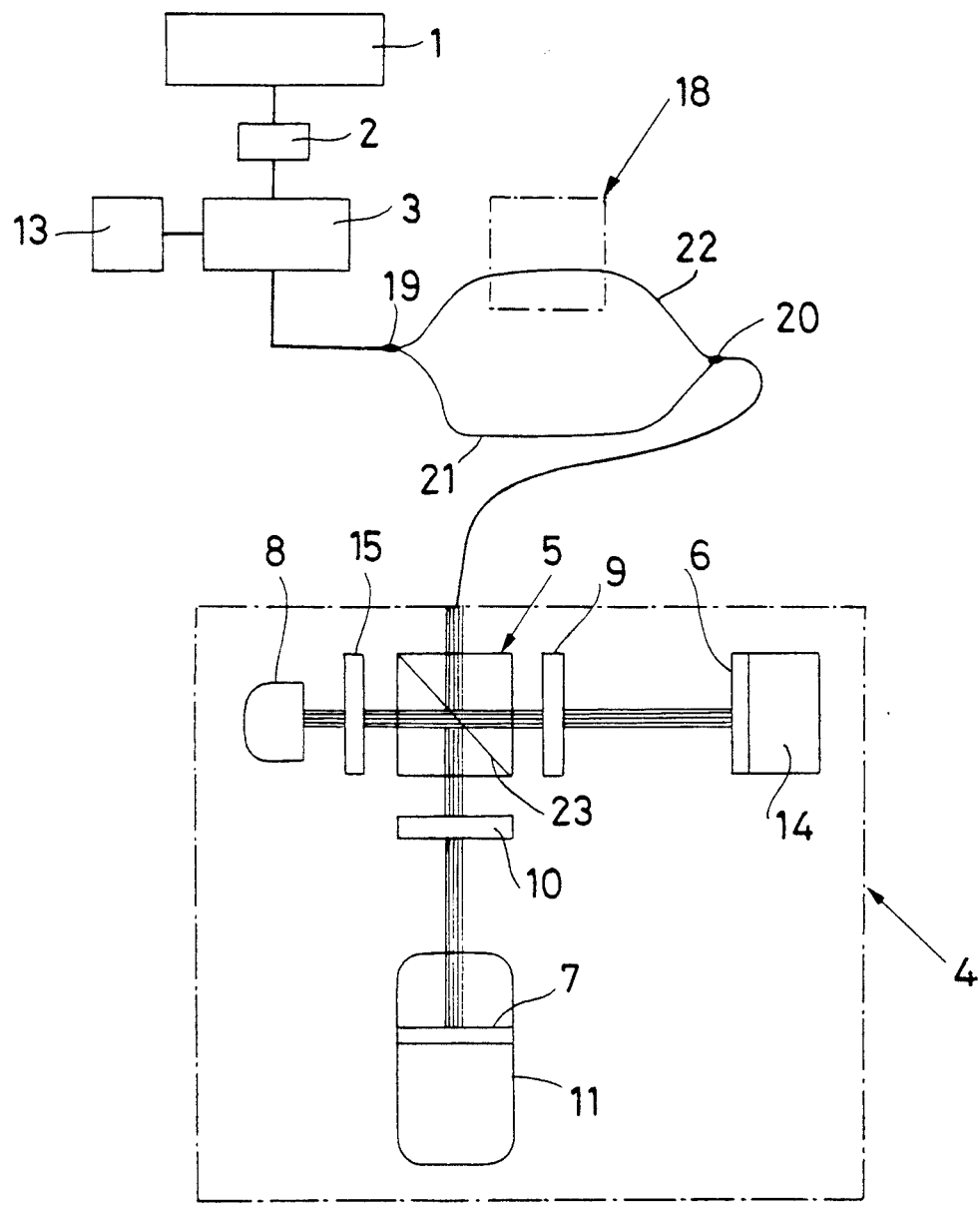
FIG. 2 illustrates a second embodiment of the apparatus according to the invention.

With reference to FIG. 2, a second embodiment of the apparatus according to the invention provides for the interposition, between the filter 3 and the interferometer 4, of an optical reference fibre 21 and of an optical measurement fibre 22 coupled by means of input and output couplers 19, 20.

The interferometer 4 in this case has only a function of initial calibration, allowing the compensation of possible differences, even if very small, in the length of the fibres 21, 22. For this purpose the distance of the target mirror 7 from the optical beam splitter 5 is adjusted so that in the absence of environmental perturbation on the fibre 22 the times of propagation of the components of the light beam that passes through the fibres 21, 22 are the same.

According to this embodiment, once the initial calibration operation has been executed, the optical measurement fibre 22 is subjected to a particular physical magnitude, such as a temperature, a deformation, a pressure and so on, symbolised with the dotted-line 18, that has the effect of changing the speed of propagation of the component of the light beam emitted by the source 1 that passes through it with respect to that of the light beam that passes through the reference fibre 21. Due to this perturbation the components of the light beam coming from the two fibres enter the interferometer 4 and thus the detector 8 with a given phase shift. The phase shift between said components is thus indicative of the particular physical magnitude to which the fibre 22 is subjected.

Figure 3:
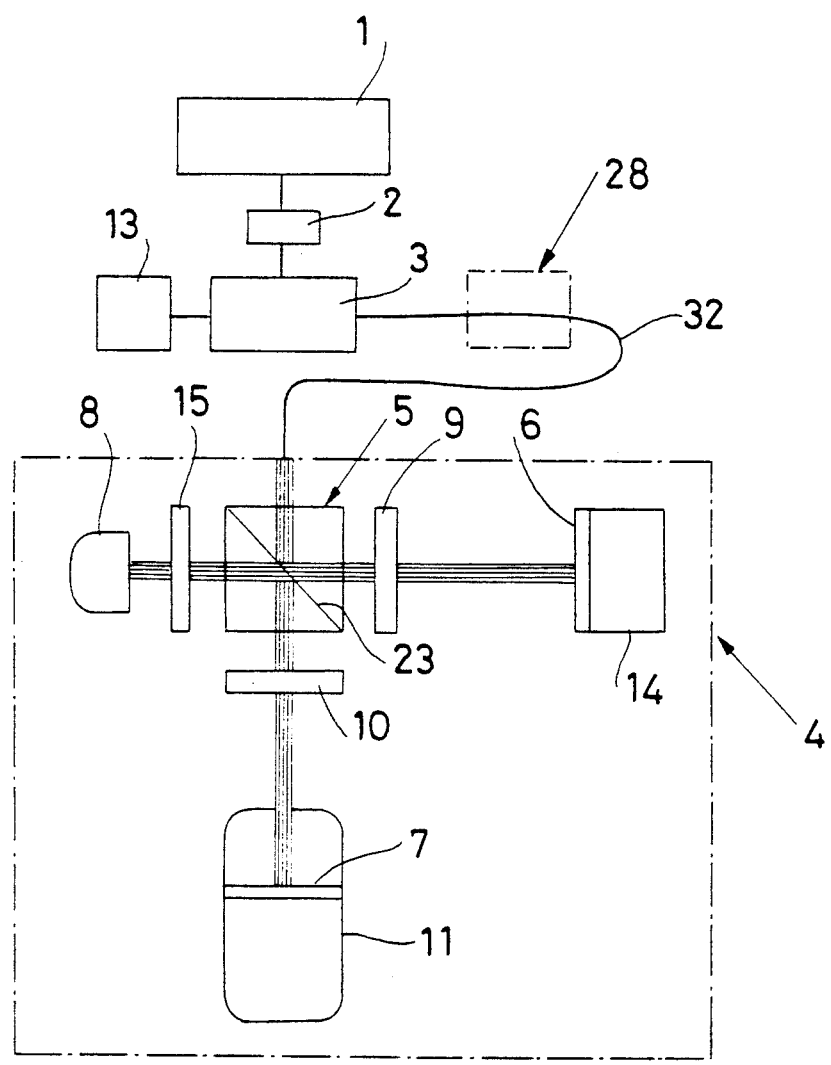
FIG. 3 illustrates a third embodiment of the apparatus according to the invention.

With reference to FIG. 3, according to a third embodiment, the apparatus provides for the presence of a fibre 32 having a high birefringence interposed between the filter 3 and the interferometer 4.

According to this embodiment, once the initial calibration operation has been executed in the manner described with reference to FIG. 2, the optical fibre 32 is subjected to a particular physical magnitude, indicated with the dotted line 28. The latter has a different repercussion on the two bias modes of the light beam, in the sense that the speed of propagation of the component of the beam according to one bias mode is different from that of the component according to a perpendicular bias mode. As already described with reference to FIG. 2, the components of the light beam corresponding to the two bias modes enter the interferometer 4 with a given relative phase shift and are thus received by the detector 8 with the same phase shift. As a result of this it is possible to assess the physical magnitude to which the fibre 32 is subjected.

We claim:

1. Process for absolute interferometric measurements of physical magnitudes, comprising the steps of:
   providing a wide-band light beam from a source,
   frequency modulating said light beam by means of a pass-band filtering process located downstream of the light beam source and centered on a frequency that is made to vary with a predetermined law,
   phase shifting of components of the light beam as a function of the physical magnitude to be measured, and
   detecting and measuring the phase shift of said components of the light beam.

2. Process according to claim 1, characterised in that said predetermined law is a sinusoidal law.

3. Apparatus for absolute interferometric measurements of physical magnitudes comprising:
   a wide-band light beam source,
   means for the frequency modulation of said light beam including a pass-band filter located downstream of the light beam source and centered on a frequency that is made to vary according to a predetermined law,
   means for splitting and recombining beams to cause the splitting of the light beam into two components with a mutual phase shift dependent on the physical magnitude to be measured, and
   a detector suitable for receiving said components of the light beam and for measuring their mutual phase shift.

4. Apparatus according to claim 3, characterised in that said predetermined law is a sinusoidal law.

5. Apparatus according to claim 3, characterised in that said source is a superluminescent laser source.

6. Apparatus according to claim 3, characterised in that said filter is of the interferential type.

7. Apparatus according to claim 3, characterised in that said filter is of the Fabry Perot type.

8. Apparatus according to claim 3, characterised in that said means for splitting and recombining beams comprise an optical beam splitter with a semitransparent lamina, which splits the light beam into a reflected component directed toward a reference mirror and into a transmitted component directed toward a target mirror that can be placed at a variable distance from the optical splitter and recombines said components into a single beam after reflection on the part of said mirrors, so that the phase shift of said recombined components is indicative of the variable position of said target mirror.

9. Apparatus according to claim 8, characterised in that said optical beam splitter is of the bias-difference type and there are two quarter-wave laminae interposed between said beam splitter and said mirrors.

10. Apparatus according to claim 3, characterised in that said means for splitting and recombining beams comprise an optical reference fibre and of an optical measurement fibre connected at the extremities by input and output couplers, said optical measurement fibre being subjected to a physical magnitude suitable for determining the difference between the time of propagation of the component of the light beam that passes through it and that of the component of the light beam that passes through the reference fibre 21.

11. Apparatus according to claim 3, characterised in that said means for splitting and recombining beams comprise an optical fibre having a high birefringence subjected to a physical magnitude suitable for having a different effect on the speeds of propagation of the two components of the light beam that propagate according to the fibre's two bias modes.

* * * * *